(12) United States Patent
Clarke

(10) Patent No.: US 9,800,690 B1
(45) Date of Patent: Oct. 24, 2017

(54) CONTENT-BASED REDIRECTION

(71) Applicant: TATA COMMUNICATIONS (AMERICA) Inc., Herndon, VA (US)

(72) Inventor: Donald Peregrine Clarke, Gliroy, CA (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 428 days.

(21) Appl. No.: 13/793,972

(22) Filed: Mar. 11, 2013

Related U.S. Application Data

(63) Continuation of application No. 12/459,190, filed on Jun. 26, 2009, now abandoned.

(51) Int. Cl.
*G06F 15/16* (2006.01)
*H04L 29/06* (2006.01)

(52) U.S. Cl.
CPC .................................. *H04L 67/42* (2013.01)

(58) Field of Classification Search
CPC ......... G06F 15/16; G06F 15/173; G06F 17/30
USPC ........ 709/203, 217, 219, 231; 707/200, 203, 707/204; 13/203, 217, 219, 231
See application file for complete search history.

(56) References Cited

U.S. PATENT DOCUMENTS

| | | | |
|---|---|---|---|
| 7,783,777 B1 * | 8/2010 | Pabla et al. | 709/238 |
| 7,818,355 B2 | 10/2010 | Mills et al. | |
| 8,656,442 B1 * | 2/2014 | Clarke | H04L 65/605 709/203 |
| 2002/0078174 A1 * | 6/2002 | Sim | G06F 17/30194 709/219 |
| 2003/0050966 A1 | 3/2003 | Dutta et al. | |
| 2003/0217096 A1 * | 11/2003 | McKelvie | H04L 12/581 709/202 |
| 2003/0233423 A1 * | 12/2003 | Dilley | H04L 29/06 709/214 |
| 2004/0249965 A1 * | 12/2004 | Huggins | H04L 29/06027 709/231 |
| 2006/0161604 A1 * | 7/2006 | Lobo | G06F 17/30067 |
| 2007/0162945 A1 | 7/2007 | Mills et al. | |
| 2007/0174915 A1 * | 7/2007 | Gribble | G06F 21/53 726/24 |

(Continued)

OTHER PUBLICATIONS

Adobe-Contents, Flash Media Server Developer Documentation, http://livedocs.adobe.com/flashmediaserver/3.0/hpdocs/toc.html, Jun. 25, 2009.

(Continued)

*Primary Examiner* — Natisha Cox
(74) *Attorney, Agent, or Firm* — Hubbs, Enatsky & Inoue PLLC

(57) ABSTRACT

Content-based redirection with respect to communication protocols whose standard configurations do not support such functionality is disclosed. In some embodiments, prior to requesting a content item, a client queries a server for the availability of the content item. In the event that the content item is available at the server, the server responds to the query indicating that the content item is available, and the client obtains the content item or a desired portion of the content item from the server. In the event that the content item is not available at the server, the server responds to the query indicating an alternative location at which the content item may be available, and the client redirects to the alternative location.

15 Claims, 7 Drawing Sheets

(56) References Cited

U.S. PATENT DOCUMENTS

| | | |
|---|---|---|
| 2008/0071859 A1 | 3/2008 | Seed et al. |
| 2008/0077635 A1 | 3/2008 | Sporny et al. |
| 2008/0091845 A1 | 4/2008 | Mills et al. |
| 2008/0235200 A1 | 9/2008 | Washington et al. |
| 2009/0003600 A1* | 1/2009 | Chen .................... H04N 7/1675 380/217 |
| 2009/0013414 A1 | 1/2009 | Washington et al. |
| 2009/0259611 A1 | 10/2009 | Wang et al. |
| 2009/0271495 A1 | 10/2009 | Allen et al. |
| 2009/0282159 A1* | 11/2009 | Wang .................... H04L 61/609 709/231 |
| 2010/0070608 A1 | 3/2010 | Hosur et al. |
| 2010/0094931 A1 | 4/2010 | Hosur et al. |
| 2010/0185776 A1 | 7/2010 | Hosur et al. |

OTHER PUBLICATIONS

Adobe-applicationsredirectConnection(), Flash Media Server Developer Documentation, http://livedocs.adobe.doc/flashmediaserver/3.0/hpdocs/00000251.html, Jun. 25, 2009.

\* cited by examiner

CONTENT-BASED REDIRECTION

CROSS-REFERENCE TO RELATED APPLICATION

This application is a continuation of U.S. application Ser. No. 12/459,190 filed on Jun. 26, 2009.

BACKGROUND OF THE INVENTION

Some client-server communication protocols do not support redirection of content requests. It would be useful for such communication protocols to support content-based redirection.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
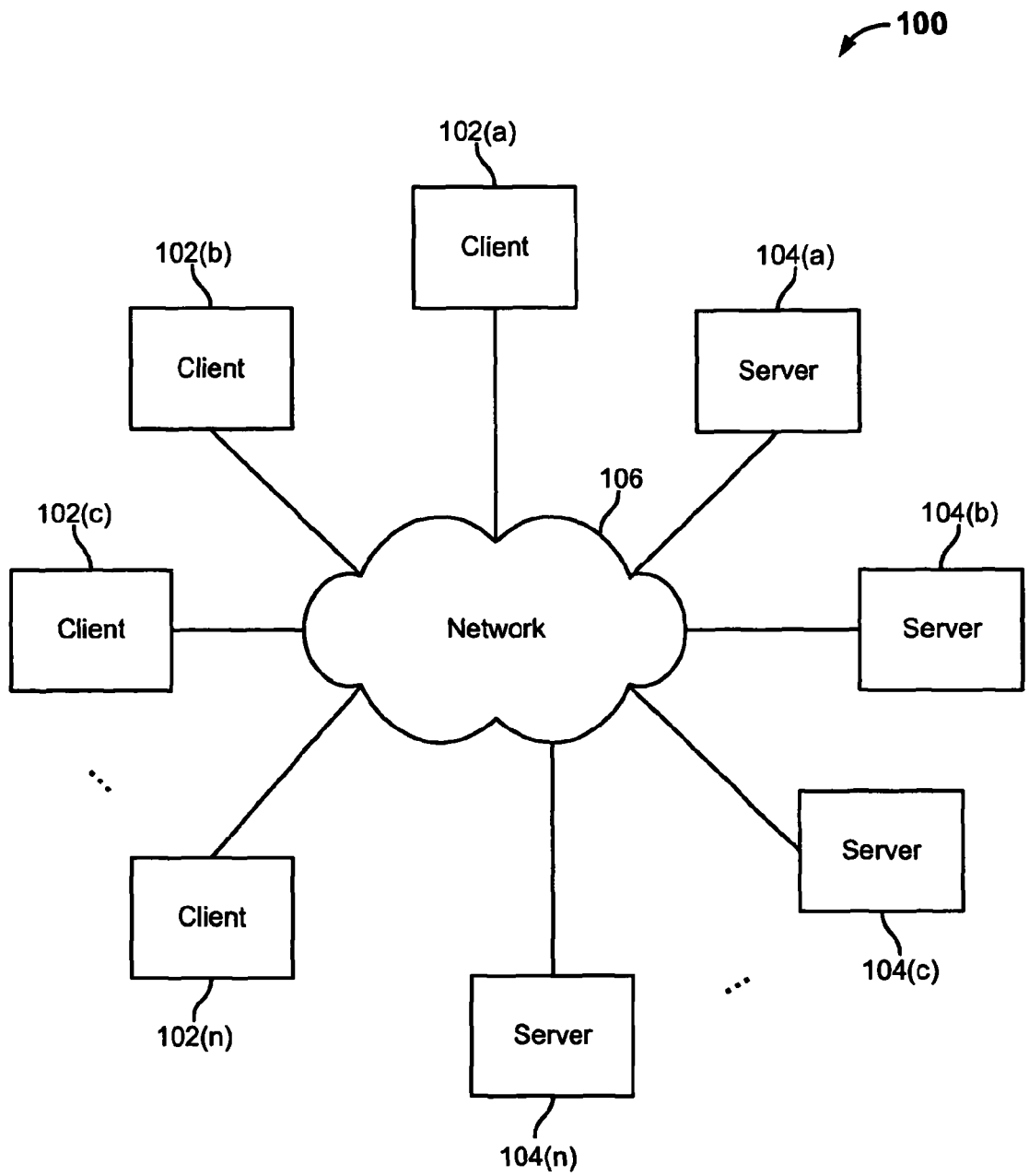
FIG. 1 is a block diagram illustrating an embodiment of a client-server network environment.

FIG. 1 is a block diagram illustrating an embodiment of a client-server network environment 100. Clients 102 and servers 104 communicate via network 106, which may comprise any private and/or public network, such as a LAN, WAN, the Internet, etc. In some embodiments, at least a subset of servers 104 comprises nodes of a CDN (Content Delivery Network). In some embodiments, a server 104 comprises a streaming media server that services requests for media content from one or more clients 102. For example, a server 104 may comprise a streaming video server. A requested media file or portion thereof received from a server 104 may be played back at a client 102 using any appropriate media player (e.g., a Flash player), which may support any one or more media file formats (e.g., Flash video). A media player at the client-side, for example, may comprise an external application at a client 102 or may comprise an embedded player in a website being accessed by a client 102. In some embodiments, a client-side media player comprises a custom media player configured to support redirection.

In various embodiments, clients 102 and servers 104 may communicate using any appropriate protocols. For example, a client and a server may communicate via HTTP (Hypertext Transfer Protocol). In such cases, a response from a server to a request for content from a client may comprise the requested content if it is available at the server, an indication that the requested content is unavailable, or a redirect to another server that may be able to service the request. With HTTP, redirection may be achieved, for example, via an HTTP 302 redirect by which the client is notified of an alternative location at which to try for the requested content. Redirection is particularly relevant in the context of a CDN framework in which a CDN node that receives requests for content may not locally store every single file that may be requested. If content requested by a client is not available at a CDN node at which the request is received, the client may be redirected to another node that may be able to service the content request.

Figure 2:
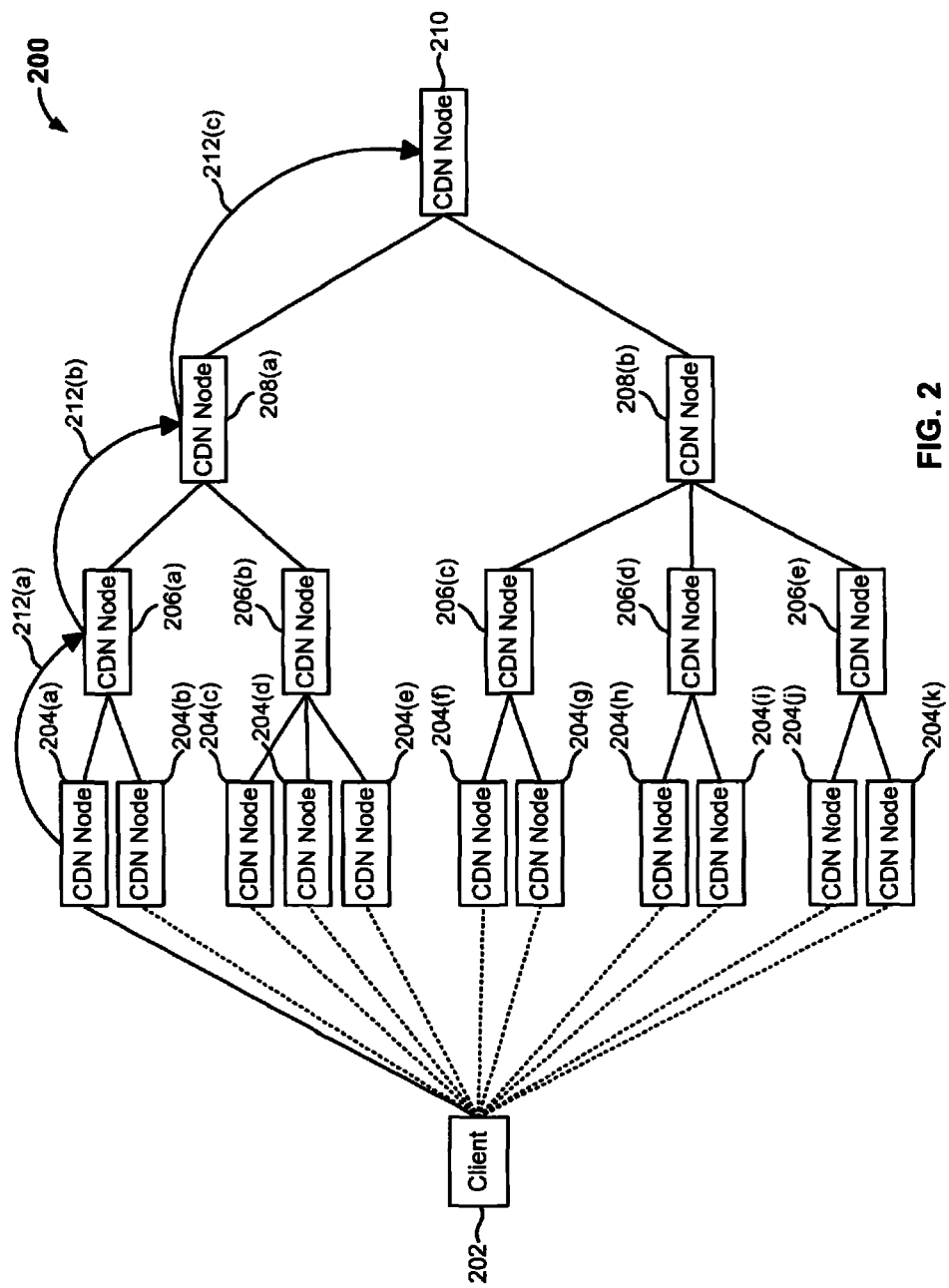
FIG. 2 is a block diagram illustrating an embodiment of request redirection in a CDN.

FIG. 2 is a block diagram illustrating an embodiment of request redirection in a CDN 200. In the given example, CDN 200 at least in part comprises an anycast network. In an anycast network, there exists a one-to-many association between network addresses and network endpoints, where each network address identifies a set of receiver endpoints, but only one of them is selected at any given time to receive information from any given client. Data is typically routed to the "best" destination, such as the topologically and/or geographically closest destination to the client. For example, a particular content item (e.g., a particular video file) may be accessed via a single URL (Uniform Resource Locator) from anywhere in the world, which is resolved into one of many possible servers depending on which one is the closest to the requesting client. If a content item identified by a URL is not available at a CDN server that receives a request for that content item, in some embodiments, the requesting client is redirected to another server in the CDN, which effectively changes the URL of the requested content item to specifically point to the server to which the client is redirected. A client may undergo a series of one or more redirects within a CDN, e.g., transparently to the end user of the client, when accessing a desired content item.

In the example illustrated in FIG. 2, a content item request from client 202 may be received by any one of CDN nodes 204 as indicated by the lines between client 202 and CDN nodes 204. In some embodiments, the content item is requested by the client via an associated URL. In the given example, the content item request from client 202 is received by CDN node 204(a) as indicated by the solid line between client 202 and CDN node 204(a), e.g., because CDN node 204(a) is the topologically and/or geographically closest CDN node 204 to client 202. If the requested content item is not available at CDN node 204(a), in various embodiments, the client may be redirected to one or more other peer (204) and/or upstream (206, 208, 210) nodes until either one of the other nodes is able to service the request or conclude and indicate to client 202 that the requested content item is not available in CDN 200. In the given example, redirection arrows 212 indicate recursive redirection from node 204(a) to upstream nodes 206(a), 208(a), and 210. In some embodiments, CDN node 210 corresponds to a master or global origin of the CDN that stores (nearly) the entire corpus of content associated with the CDN.

Some communication protocols, however, do not support redirection of content requests. For example, content request redirection is not supported by some protocols used to enforce digital rights management (DRM) such as RTMP (Real Time Messaging Protocol). RTMP may be employed for streaming audio, video, and/or other data between a media player at a client that supports RTMP and an RTMP server. With RTMP, control of data is essentially maintained server-side in order to prevent an end user at a client from locally copying or ripping received data. To play a video file client-side using RTMP, the player at the client first establishes a connection with the RTMP server that hosts the desired video file. Once a connection has been established between the client and the server, the player issues a command to the server to play a desired video file, and in response the server begins streaming the video data to the client, which is played back in nearly real time by the player as it is received at the client and once played back discarded so that it is not stored or cached client-side. Since the data is not locally persisted client-side, playback commands (e.g., play, pause, stop, fast forward, rewind, seek, etc.) are sent as messages by the player to the server, and the server responds by sending the appropriate data and/or stops sending data to the client as applicable. For instance, in response to a pause command, the player locally stops playing the video at the client and sends the command to the server so that the server stops sending further data.

The standard configuration of a protocol such as RTMP is based on the assumption that the location from which a desired file is to be obtained is known, e.g., that a URL associated with a desired file points to a server from which the file can be obtained. Thus, the standard configuration of a protocol such as RTMP does not support the redirection of content requests. When a client requests a prescribed file or portion thereof from a server, the server is expected either to provide the requested data to the client if the file exists at the server or to provide an indication to the client that the file is unavailable if the file does not exist at the server. It is, however, desirable in many contexts to allow content-based redirection with respect to protocols whose standard configurations do not provision for such functionality. For example, it may desirable for a CDN to serve (e.g., copyrighted) content using a protocol such as RTMP. However, as described above, redirection is important in the context of a CDN since every CDN node may not store every single file available in the CDN. Content-based redirection with respect to a protocol whose standard configuration does not support such functionality is further described herein.

Although content-based redirection with respect to RTMP is described in some examples, the techniques described herein may be employed with respect to any other communication protocol whose standard configuration does not support such functionality. For example, the described techniques may be employed with respect to communication protocols used by Windows Media Services such as RTSP (Real Time Streaming Protocol). Protocols that provide some form of digital rights management tend to not provision for content-based redirection, and the described techniques may be employed with respect to any such protocols.

In some embodiments, an extra command or message is added to a communication protocol that allows a client to query a server for the availability of a desired content item, e.g., prior to requesting the content item from the server. For example, a media player communicating with a server using RTMP may query the server for the availability of a desired media file at the server prior to issuing a play command to the server. In some such cases, the query is made using the standard RPC (Remote Procedure Call) mechanism built into a standard Flash player, and the query specifies the path of the file. As used herein, the term "content item" refers to any or any part of a file, data structure, or other data hosted by a server. In response to a query for the availability of a content item, a server is in some embodiments configured to provide one of three responses to a client. If the content item is available at the server, the server responds to the query affirmatively, and the client can access the content item from the server in a standard manner (e.g., via a play command in RTMP). If the content item is not available at the server but if the server is configured with an alternative location at which the content item may be available (e.g., in an associated CDN), the response from the server to the query includes a URL corresponding to the alternative location that the client can try, and the client can then attempt to access the content item from the alternative location. If the content item is not available at the server and if the server is not configured with an alternative location at which the content item may be available (e.g., in an associated CDN), the server responds to the query negatively, indicating to the client that the file is not available.

Figure 3:
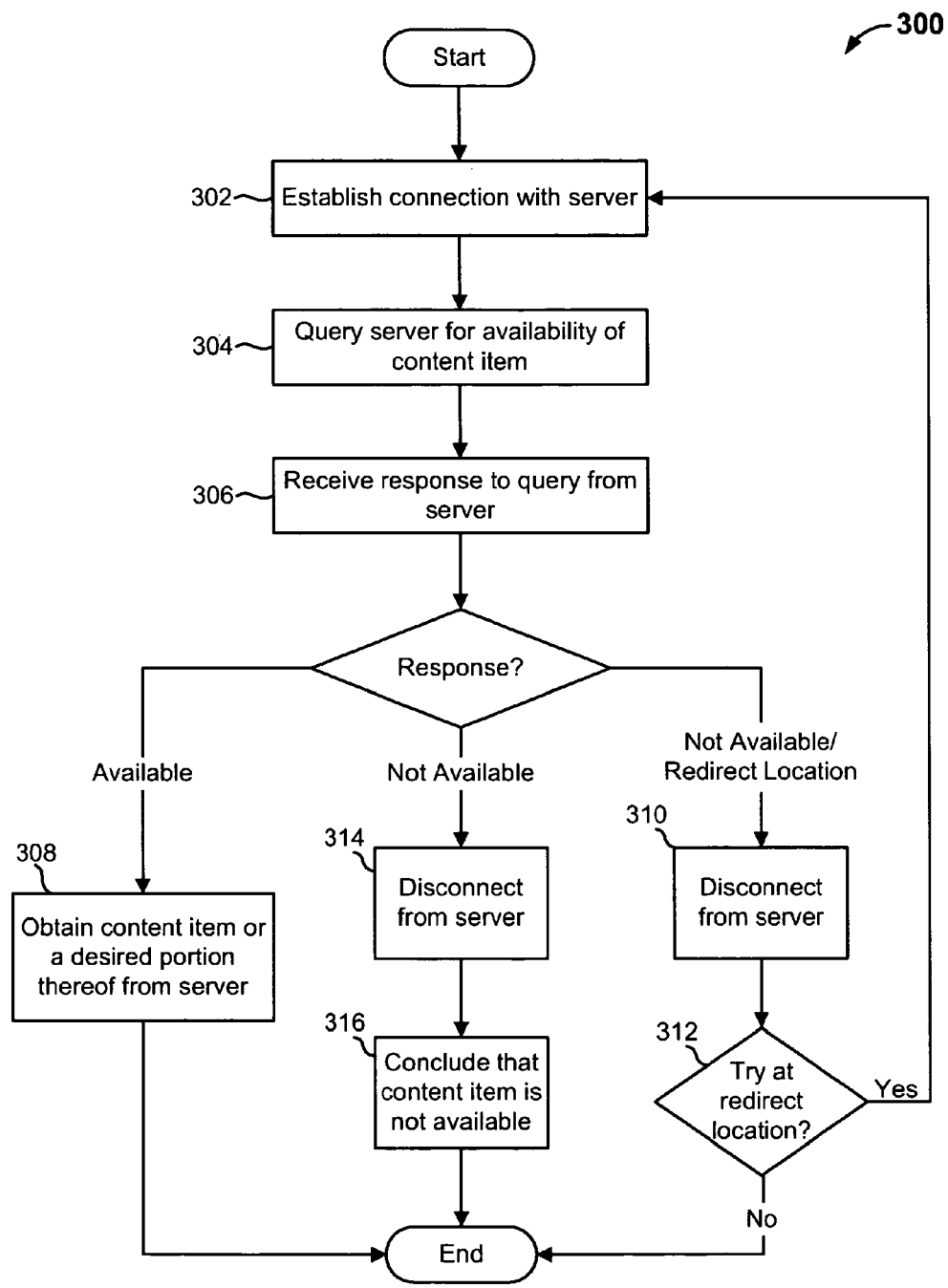
FIG. 3 is a flow chart illustrating an embodiment of a process for accessing a desired content item.

FIG. 3 is a flow chart illustrating an embodiment of a process for accessing a desired content item. For example, process 300 may be employed by a client, such as a client 102 in FIG. 1 or client 202 in FIG. 2, or by a media player at a client, e.g., when accessing or attempting to access a desired video or other multimedia file. Process 300 may be employed with respect to any appropriate client-server communication protocol. In some embodiments, the communication protocol is not HTTP based but rather message based. In some embodiments, the communication protocol provides some form of digital rights management. In some embodiments, the communication protocol comprises a video service protocol such as RTMP.

Process 300 starts at 302 at which a connection with a server is established. For example, the connection with the server may be established at 302 in response to an indication from an end user that a content item (e.g., a video file or part thereof) is desired at the client. The indication may be received, for example, in response to the user entering a URL associated with the content item into a browser or the user selecting an associated hyperlink. In some embodiments, a connection is established at 302 with a topologically and/or geographically closest server. At 304, the server with which the connection is established at 302 is queried for the availability of the content item, and at 306 a response to the query is received from the server. If the response from the server received at 306 indicates that the content item is available at the server, the content item or a desired portion thereof is obtained from the server at 308, and process 300 subsequently ends. If the response from the server received at 306 indicates that the content item is not available at the server but indicates a redirect location at which the content item may be available, the connection established with the server at 302 is disconnected at 310, and process 300 proceeds to 312 at which it is determined whether to attempt accessing the content item at the redirect location. In some cases, the redirect location comprises a URL to an alternative server, e.g., in an associated CDN, such as a next or nearest upstream server in the CDN topology. If it is determined at 312 to attempt to access the content item at the redirect location, process 300 iterates and continues at 302 at which a connection is established with the server of the redirect location. If it is determined at 312 to not attempt to access the content item at the redirect location, process 300 ends. In some embodiments, process 300 is configured to iterate not more than a threshold number of times, e.g., so that a client does not redirect more than a threshold number of times. Limiting the number of redirects safeguards against looping and prevents unnecessary delays. If the client has not redirected the threshold number of times, it is determined at 312 to continue, and process 300 proceeds to 302 at which a connection is established with the server of the redirect location. If the client has already redirected the threshold number of times, it is determined at 312 not to continue, and process 300 ends. In some embodiments, the threshold is a tunable value. In some embodiments, step 312 is optional, and if a redirect location is provided with the response received at 306, the content item is at least attempted to be accessed from that redirect location. If the response from the server received at 306 indicates that the content item is not available at the server and no redirect location is provided, the connection established with the server at 302 is disconnected at 314, and it is concluded at 316 that the content item is not available. Process 300 subsequently ends. Process 300 is repeated with respect to each server from which the content item is attempted to be accessed.

Figure 4:
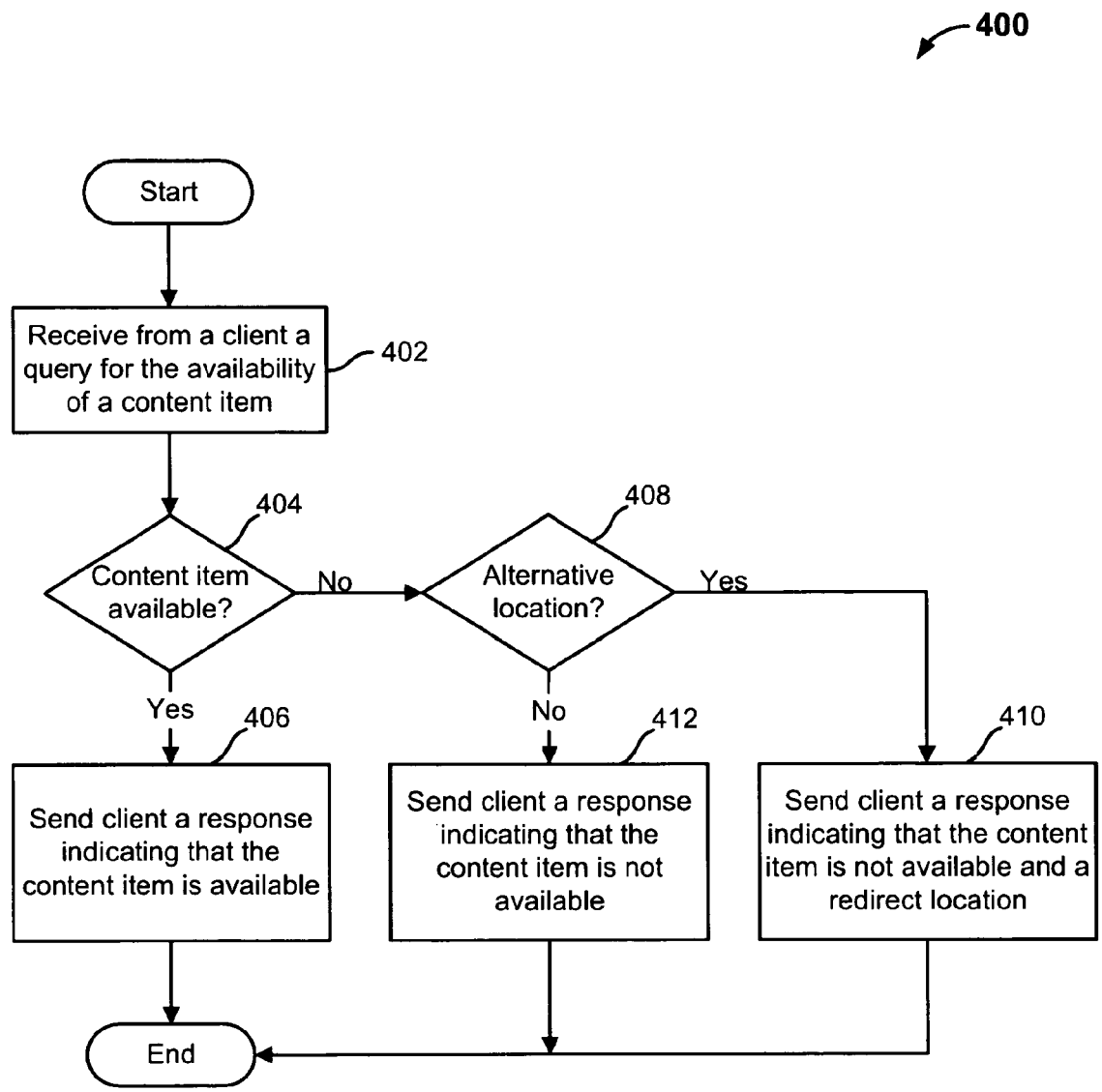
FIG. 4 is a flow chart illustrating an embodiment of a process for responding to a query from a client for the availability of a content item.

FIG. 4 is a flow chart illustrating an embodiment of a process for responding to a query from a client for the availability of a content item. For example, process 400 may be employed by a server such as any of servers 104 in FIG. 1, 204-210 in FIG. 2, or 502 in FIG. 5. In some embodiment, process 400 is used by a server to respond to a query sent to the server by a client at 304 of process 300. Process 400 may be employed with respect to any appropriate client-server communication protocol. In some embodiments, the communication protocol is not HTTP based but rather message based. In some embodiments, the communication protocol provides some form of digital rights management. In some embodiments, the communication protocol comprises a video service protocol such as RTMP.

Process 400 starts at 402 at which a query for the availability of a content item is received from a client. At 404, it is determined whether the content item is available. In some embodiments, it is determined at 404 whether the content item is available at the server that receives the query at 402 or at another server at the associated CDN node. If it is determined at 404 that the content item is available, a response to the query received at 402 is sent to the client at 406 indicating that the content item is available, and process 400 subsequently ends. If it is determined at 404 that the content item is not available, it is determined at 408 whether an alternative location at which the content item may be available (e.g., another node in an associated CDN) can be provided as a redirect location. If it is determined at 404 that the content item is not available and it is determined at 408 that an alternative location can be provided as a redirect location, a response to the query received at 402 is sent to the client at 410 indicating that the content item is not available and indicating a redirect location at which the content item may be available, and process 400 subsequently ends. The redirect location, for example, may comprise a URL of another server, such as another server in an associated CDN. In some embodiments, the redirect location corresponds to a next or nearest upstream node in the topology of the associated CDN. If it is determined at 404 that the content item is not available and it is determined at 408 that an alternative location at which to try is not available (e.g., because the content item does not exist in an associated CDN), a response to the query received at 402 is sent to the client at 412 indicating that the content item is not available or does not exist, and process 400 subsequently ends.

Figure 5:
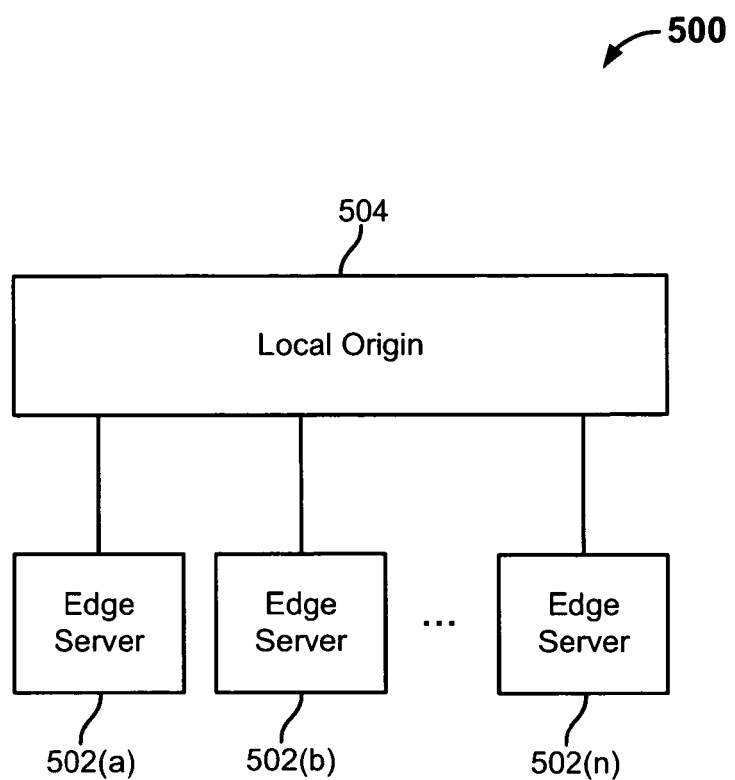
FIG. 5 is a block diagram illustrating an embodiment of a CDN node.

FIG. 5 is a block diagram illustrating an embodiment of a CDN node. For example, CDN node 500 may comprise any of servers 104 of FIG. 1 or nodes 204-210 of FIG. 2. As depicted, CDN node 500 comprises a plurality of edge servers 502(a)-(n) and a local origin 504. Edge servers 502 are configured to handle communications with clients and include relatively small caches of content items. In some cases, the cache at each edge server 502 includes at least the most recent content items that have been served to clients from that server. Local origin 504 comprises a significantly larger cache of content items. In some cases, for example, the cache of local origin 504 includes at least the most recent content items that have been served to clients from any of edge servers 502. That is, in some cases, local origin 504 comprises a union of the caches of edge servers 502 and includes at least the most recent content items served to clients by CDN node 500. In some cases, local origin 504 comprises a subset of the corpus of content items of the associated CDN. Alternatively, in some cases, local origin 504 comprises a master or global origin that includes (nearly) the entire corpus of content items of the associated CDN. In some embodiments, local origin 504 comprises one or more HTTP servers. One or more edge servers 502 of CDN node 500 may be configured to communicate with clients via protocols other than HTTP. For instance, one or more edge servers 502 may be configured to run RTMP service.

Redirecting and reconnecting to multiple servers introduces significant latency. Thus, it is optimal to minimize the chain of redirects. In some embodiments of a CDN in which any of many hosts in the CDN hierarchy may have a copy of a particular content item, it is useful to perform a local search for the content item so that proxying can be employed over short distances (e.g., within one CDN node or site such as CDN node 500 of FIG. 5) and redirection is only resorted to over larger distances (e.g., across CDN nodes or sites such as between CDN nodes 204, 206, 208, and/or 210 of FIG. 2). In some such cases, if a requested content item is not available at a server (e.g., 502(a) in FIG. 5) that receives the request from a client, the server checks a set of local hosts (e.g., peer servers 502(b)-(n) in FIG. 5) and/or a local cache that represents the set of local hosts (e.g., local origin 504) for the content item; and if the content item is locally found at the CDN node, the server proxies the content item from the location at which it is available and sends it to the client when the content item is requested by the client. For example, if a requested content item is not available at an RTMP server that receives the request, the RTMP server may check for the availability of the content item elsewhere at the CDN node via HEAD requests to one or more local HTTP servers (e.g., associated with local origin 504 of FIG. 5); and if the content item is locally found, the RTMP server may proxy the content item via HTTP from the host at which it is available, convert the received data to RTMP, and forward it to a requesting client. In some embodiments, a replication process for downloading the content item to the server from which it is requested is triggered in parallel to a proxying process. That is, a content item being proxied by a server is in parallel copied to the server since it is likely that the content item will be requested from that server again, e.g., from another client. In some embodiments, the proxying and replication processes are independent of one another. In some cases in which a replication process is triggered by a proxying process, the client is served proxied data while the replication process is in progress, but once the replication process has completed, the server can terminate the proxying process if it is still in progress and begin serving the content item to the client from its own cache.

Figure 6:
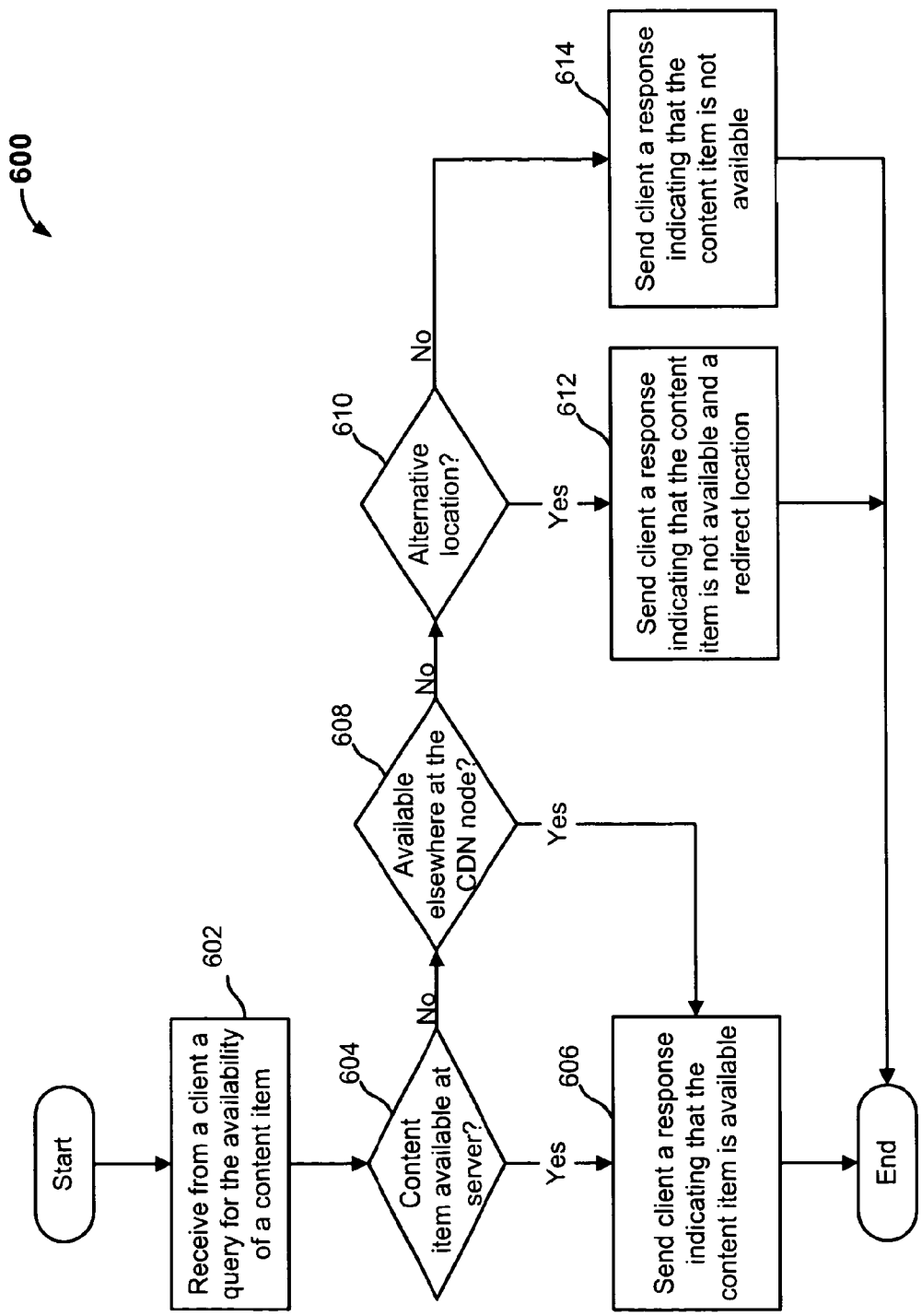
FIG. 6 is a flow chart illustrating an embodiment of a process for responding to a query from a client for the availability of a content item.

FIG. 6 is a flow chart illustrating an embodiment of a process for responding to a query from a client for the availability of a content item. For example, process 600 may be employed by a server such as any of servers 104 in FIG. 1, 204-210 in FIG. 2, or 502 in FIG. 5. In some embodiment, process 600 is used by a server to respond to a query sent to the server by a client at 304 of process 300. Process 600 may be employed with respect to any appropriate client-server communication protocol. In some embodiments, the communication protocol is not HTTP based but rather message based. In some embodiments, the communication protocol provides some form of digital rights management. In some embodiments, the communication protocol comprises a video service protocol such as RTMP.

Process 600 starts at 602 at which a query for the availability of a content item is received from a client. At 604, it is determined whether the content item is available at the server that receives the query at 602. If it is determined at 604 that the content item is available at the server that receives the query at 602, a response to the query received at 602 is sent to the client at 606 indicating that the content item is available, and process 600 subsequently ends. If it is determined at 604 that the content item is not available at the server that receives the query at 602, it is determined at 608 whether the content item is available at another host at the associated CDN node. In some embodiments, the determination of 608 is made via HEAD requests to one or more HTTP servers at the CDN node, such as one or more HTTP servers associated with a local origin or cache of the CDN node. If it is determined at 608 that the content item is available at another host at the associated CDN node, process 600 proceeds to 606 at which a response to the query received at 602 is sent to the client indicating that the content item is available, and process 600 subsequently ends. If it is determined at 608 that the content item is not available at another host at the associated CDN node, it is determined at 610 whether an alternative location at which the content item may be available (e.g., another node in an associated CDN) can be provided as a redirect location. If it is determined at 610 that an alternative location can be provided as a redirect location, a response to the query received at 602 is sent to the client at 612 indicating that the content item is not available but indicating a redirect location at which the content item may be available, and process 600 subsequently ends. The redirect location, for example, may comprise a URL of another server, such as another server in an associated CDN. In some embodiments, the redirect location corresponds to a next or nearest upstream node in the topology of the associated CDN. If it is determined at 610 that an alternative location at which to try is not available (e.g., because the content item does not exist in an associated CDN), a response to the query received at 602 is sent to the client at 614 indicating that the content item is not available or does not exist, and process 600 subsequently ends.

Figure 7:
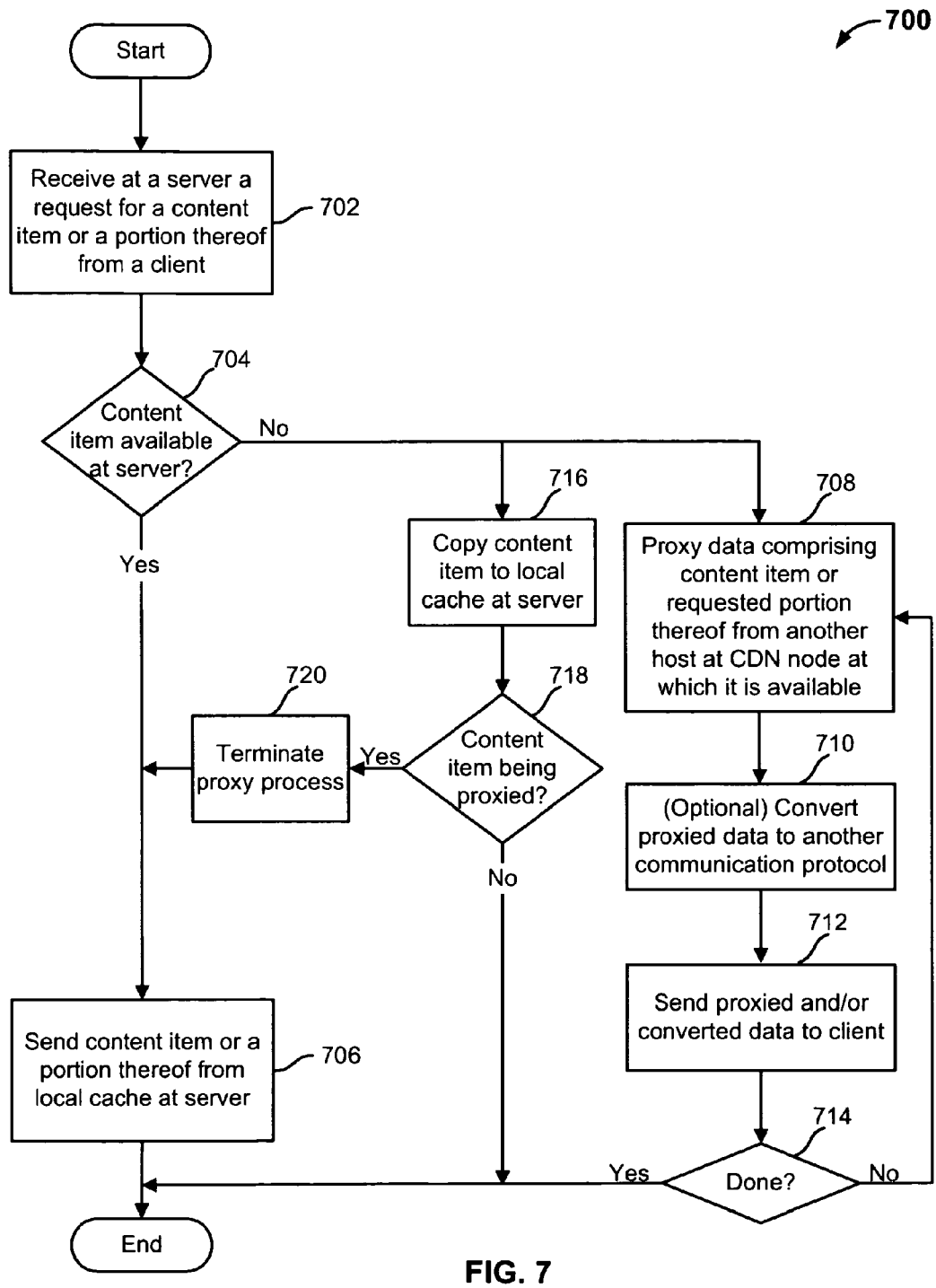
FIG. 7 is a flow chart illustrating an embodiment of a process for providing a requested content item or portion thereof to a client.

FIG. 7 is a flow chart illustrating an embodiment of a process for providing a requested content item or portion thereof to a client. For example, process 700 may be employed by a server such as any of servers 104 in FIG. 1, 204-210 in FIG. 2, or 502 in FIG. 5. In some embodiment, process 700 is employed by a server to provide a content item or portion thereof requested by a client at 308 of process 300. Process 700 may be employed with respect to any appropriate client-server communication protocol. In some embodiments, the communication protocol is not HTTP based but rather message based. In some embodiments, the communication protocol provides some form of digital rights management. In some embodiments, the communication protocol comprises a video service protocol such as RTMP.

Process 700 starts at 702 at which a request for a content item or portion thereof is received at a server from a client. At 704, it is determined whether the requested content item is available at the server. For example, it is determined at 704 whether the content item is locally cached at the server. If it is determined at 704 that the content item is available at the server, the content item or the requested portion of the content item is sent to the client from the local cache of the server at 706, and process 700 subsequently ends. In some embodiments, the content item or portion thereof is streamed from the server to the client at 706. If it is determined at 704 that the content item is not available at the server, at 708 data comprising the content item or requested portion of the content item is proxied by the server from another host at which the content item is available at the associated CDN node (e.g., from the local origin of the CDN node). In some embodiments, the data is proxied via HTTP. At 710, the proxied data is optionally converted to conform with a communication protocol (e.g., RTMP) used between the client and the server, if needed. At 712, the proxied and/or converted data is sent to the client. For example, the data is streamed to the client at 712. At 714, it is determined whether delivery of the content item or the requested portion of the content item to the client has completed. If it is determined at 714 that delivery of the content item or the requested portion of the content item to the client has completed, process 700 subsequently ends. If it is determined at 714 that delivery of the content item or the requested portion of the content item to the client has not completed, process 700 continues at 708. Steps 708-714 associated with proxying are repeated until delivery of the data comprising the content item or the requested portion of the content item is complete or proxying is terminated at 720. In some embodiments, the content item is copied to the local cache of the server at 716 via a separate or parallel step to the proxy steps 708-714 so that, e.g., it is locally available at the server. At 718, it is determined whether the content item is still being separately proxied via steps 708-714. If it is determined at 718 that the content item is no longer being proxied (e.g., because delivery of the data comprising the content item or the requested portion of the content item to the client has completed), process 700 ends. If it is determined at 718 that the content item is still being proxied via steps 708-714 (e.g., because delivery of the data comprising the content item or the requested portion of the content item to the client has not completed), the proxy steps 708-714 are terminated at 720; and the remaining part of the requested content item or portion thereof that still needs to be sent to the client is sent to the client at 706 from the local copy at the server, and process 700 subsequently ends. In some embodiments, steps 716, 718, and/or 720 of process 700 are optional.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for content-based distribution, comprising:
   a processor configured to:
   establish a connection with a client;
   use the established connection to receive from the client a request for a content item;
   determine whether the content item is available at a server;
   in the event that the content item is available at the server, provide a response to the client including at least a portion of the content item; and
   in the event that the content item is not available at the server, check for availability of the content item at one or more alternative servers within the system, and if the content item is available at the one or more alternative servers, obtain data comprising the content item from the one or more alternative servers at the server as proxied data while also independently downloading another copy of the content item to the server in parallel, convert the proxied data to a communication protocol whose standard configuration does not support content-based redirection, and provide a response to the client including at least a portion of the content converted from the one or more alternative servers; and
   a communication interface coupled to the processor and configured to receive the request and transmit the response, wherein
   the response is provided to the client via the established connection, and
   the request and the response are communicated via the communication protocol whose standard configuration does not support content-based redirection.

2. The system recited in claim 1, wherein the alternative location comprises a proxy location.

3. The system recited in claim 1, wherein the client comprises a media player.

4. The system recited in claim 1, wherein the request and the response are communicated via RTMP (Real Time Messaging Protocol).

5. The system recited in claim 1, wherein the system comprises a node of a CDN (Content Delivery Network) and wherein the alternative location comprises a different node of the CDN.

6. The system recited in claim 1, wherein the system comprises a node of a CDN (Content Delivery Network) and wherein the alternative location comprises a nearest upstream node of the CDN.

7. The system recited in claim 1, wherein the system comprises a node of a CDN (Content Delivery Network) and wherein the alternative location comprises a master origin of the CDN.

8. The system recited in claim 1, wherein the system comprises an edge server of a CDN (Content Delivery Network) node and wherein to determine whether the content item is available comprises to determine whether the content item is available at another host at the CDN node in the event that the content item is not available at the edge server.

9. The system recited in claim 1, wherein the system comprises an RTMP server that receives the request and the processor is configured to establish a connection with the RTMP server.

10. The system recited in claim 1, further comprising:
    an RTMP server configured to establish a connection with the processor, wherein
    the one or more alternative servers is one or more HTTP servers, and
    the processor is further configured to:
    in the event that the content item is not available at the RTMP server, check for availability of the content item elsewhere in the system via HEAD requests to one or more of the HTTP servers, and if the content item is available at the one or more HTTP servers, convert the received data to RTMP and forward the received data to the client.

11. The system in claim 1, wherein the processor is configured to copy the content item to the sever.

12. The system in claim 1, wherein once the content item is copied to the server, the processor terminates the proxying process and begins providing the content item to the client from a cache of the server.

13. A method for content-based distribution, comprising:
    establishing a connection with a client;
    using the established connection to receive from the client a request for the availability of a content item;
    determining using a processor whether the content item is available;
    in the event that the content item is available, providing a response to the client including at least a portion of the content; and
    in the event that the content item is not available at the server, checking for availability of the content item at one or more alternative servers within the system, and if the content item is available at the one or more alternative servers, obtaining data comprising the content item from the one or more alternative servers at the server as proxied data while also independently downloading another copy of the content item to the server in parallel, converting the proxied data to a communication protocol whose standard configuration does not support content-based redirection, and providing a response to the client including at least a portion of the content converted from the one or more alternative servers,
    wherein the request and the response are communicated via the communication protocol whose standard configuration does not support content-based redirection.

14. A computer program product for content-based distribution, the computer program product being embodied in a non-transitory computer readable storage medium and comprising computer instructions for:
    establishing a connection with a client;
    using the established connection to receive from the client a request for the availability of a content item;

determining using a processor whether the content item is available;

in the event that the content item is available, providing a response to the client including at least a portion of the content using the established connection; and in the event that the content item is not available at the server, check for availability of the content item at one or more alternative servers within the system, and if the content item is available at the one or more alternative servers, obtain data comprising the content item from the one or more alternative servers at the server as proxied data while also independently downloading another copy of the content item to the server in parallel, convert the proxied data to a communication protocol whose standard configuration does not support content-based redirection, and provide a response to the client including at least a portion of the content converted from the one or more alternative servers, wherein the content item is available via the communication protocol whose standard configuration does not support content-based redirection and wherein the request and the response are communicated via the communication protocol.

15. The computer program product recited in claim 14, wherein the computer program product comprises a media player.

* * * * *